(12) United States Patent  
Roybal

(10) Patent No.: US 7,236,585 B2  
(45) Date of Patent: Jun. 26, 2007

(54) APPARATUS AND METHOD FOR NOISE IMMUNITY DURING SIGNAL DETECTION

(75) Inventor: Larry John Roybal, Westminster, CO (US)

(73) Assignee: Avaya Technology Corp, Basking Ridge, NJ (US)

( * ) Notice: Subject to any disclaimer, the term of this patent is extended or adjusted under 35 U.S.C. 154(b) by 1047 days.

(21) Appl. No.: 10/159,052

(22) Filed: May 31, 2002

(65) Prior Publication Data

US 2003/0223464 A1  Dec. 4, 2003

(51) Int. Cl.  
*H04M 1/00* (2006.01)
(52) U.S. Cl. ............... 379/386; 379/372; 370/526
(58) Field of Classification Search .......... 379/372, 379/386; 370/526  
See application file for complete search history.

(56) References Cited

U.S. PATENT DOCUMENTS

| 5,479,501 A | 12/1995 | Lai |
| 5,483,593 A * | 1/1996 | Gupta et al. ............. 379/386 |
| 5,719,932 A | 2/1998 | Robybal |
| 2002/0031205 A1 | 3/2002 | Kicklighter et al. |

OTHER PUBLICATIONS

U.S. Appl. No. 10/161,491, filed Aug. 31, 2002, L.J. Robybal.

* cited by examiner

*Primary Examiner*—Jefferey F. Harold  
(74) *Attorney, Agent, or Firm*—John C. Moran

(57) ABSTRACT

A noise calculation mechanism is incorporated into a cadence tone detector which upon a miss in either a energy or silence interval allows for retention of those periods corresponding to noise and augments the appropriate energy and silence interval.

14 Claims, 4 Drawing Sheets

FIG. 5

CADENCE TIMING TABLE PAIR 500

| TIMING | SIGNAL 1 | ........................ | SIGNAL X |
|---|---|---|---|
| P=1 | 522 | . | 522 |
| | | . | |
| | | . | |
| P=Y | 522 | | 522 |
| S=1 | 522 | . | 522 |
| | | . | |
| | | . | |
| S=Y | 522 | | 522 |

510 = { P=1 ... P=Y rows }
511 = { S=1 ... S=Y rows }

CADENCE TIMING TABLE PAIR 501

| TIMING | SIGNAL 1 | ........................ | SIGNAL X |
|---|---|---|---|
| P=1 | 522 | . | 522 |
| | | . | |
| | | . | |
| P=Y | 522 | | 522 |
| S=1 | 522 | . | 522 |
| | | . | |
| | | . | |
| S=Y | 522 | | 522 |

510 = { P=1 ... P=Y rows }
511 = { S=1 ... S=Y rows }

.
.
.

CADENCE TIMING TABLE PAIR 504

| TIMING | SIGNAL 1 | ........................ | SIGNAL X |
|---|---|---|---|
| P=1 | 522 | . | 522 |
| | | . | |
| | | . | |
| P=Y | 522 | | 522 |
| S=1 | 522 | . | 522 |
| | | . | |
| | | . | |
| S=Y | 522 | | 522 |

510 = { P=1 ... P=Y rows }
511 = { S=1 ... S=Y rows }

APPARATUS AND METHOD FOR NOISE IMMUNITY DURING SIGNAL DETECTION

TECHNICAL FIELD

This invention relates to telecommunication switching systems and in particular, to the detection of control signals in telecommunication switching systems.

BACKGROUND OF THE INVENTION

Within a telecommunication switching system, telecommunication switching systems use signals to communicate control information between themselves. It is necessary that the circuit receiving the signals have signal-recognition facilities (referred to as call classifiers) for detecting and recognizing various signals. Conventionally, many of these signals have been cadence signals: a pattern of signal energy on and signal energy off periods, wherein the pattern may be repeating or non-repeating. Two techniques are in call classifiers. The first technique utilizes a state machine for the signal recognition. The state machine has typically been very complex, involving large number of states even for signaling schemes that use simple cadences, and has to have been individually designed for recognizing signals used in each particular telecommunication system or country. Such a state machine is difficult and expensive to design, implement, modify or adapt for different signaling schemes. In addition, the presence of noise in the signals that are to be recognized causes the state machines to produce erroneous results. This noise problem has been solved in the prior art using classical filtering techniques employed ahead of the state machine signaling detection stages. The time variant characteristics of the noise often make such attempts at this type of filtering impractical.

The second technique that has been utilized to detect call classifiers is through the use of cadence tables. This technique uses an incoming signals cadence—its intervals of silence and energy, as an index into tables of candidate values. The table can contain a myriad of values whose outcome could lead to the detection of several different signals. In the presence of noise, the cadence tables yield many misses that would be interpreted as the identification of an unknown signal and the consequent disconnection of the classifier. These missed-identifications reduce the accuracy of tone detection.

SUMMARY OF THE INVENTION

This invention is directed to solving these and other problems and disadvantages of the prior art. A noise calculation mechanism is incorporated into a tone detector which upon a miss in either a energy or silence interval allows for retention of those periods corresponding to noise and augments the appropriate energy and silence interval.

BRIEF DESCRIPTION OF THE DRAWING

FIG. 5 illustrates tables utilized by an embodiment of the invention.

DETAILED DESCRIPTION

Figure 1:
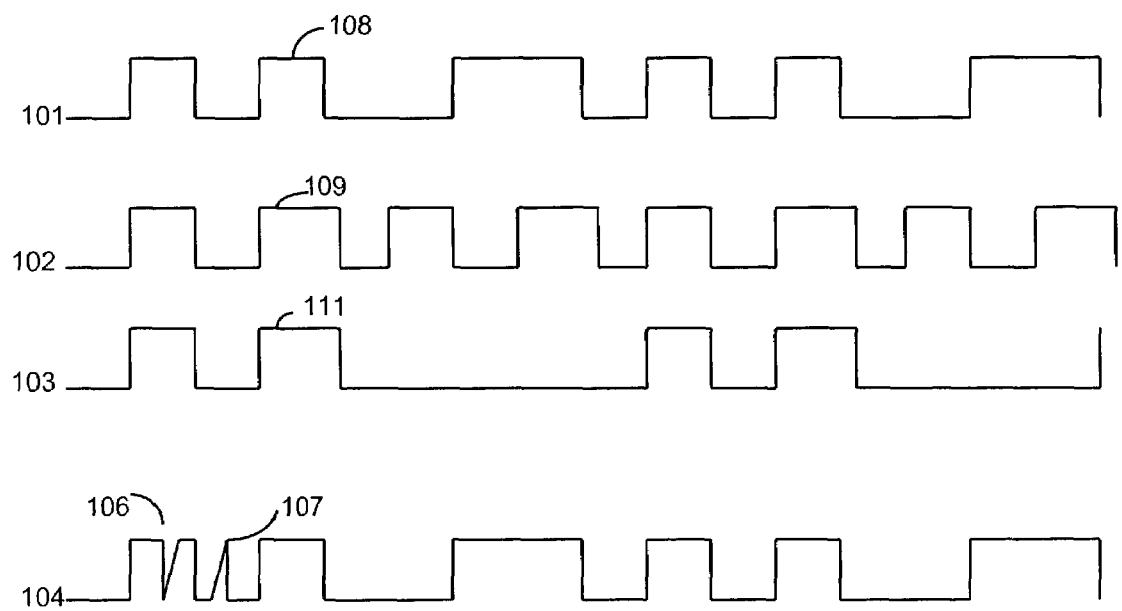
FIG. 1 illustrates signal waveforms of signal tones to be decoded.

FIG. 1 illustrates signal tones after the tones have been reduced to pulses of energy and non-energy intervals (also referred to as P and S intervals). As can be seen from signal 104 which is identical to signal 101 but with noise, there can be short bursts of noise present within the signals. For example, point 106 illustrates a noise condition that is causing the energy pulse to be temporarily reduced to non-energy. Also, point 107 illustrates that the noise can cause a non-energy interval to appear to have energy. The embodiments accordance with the invention are directed to resolving and eliminating the effects of such noise pulses in signals that are being decoded for tones.

Figure 2:
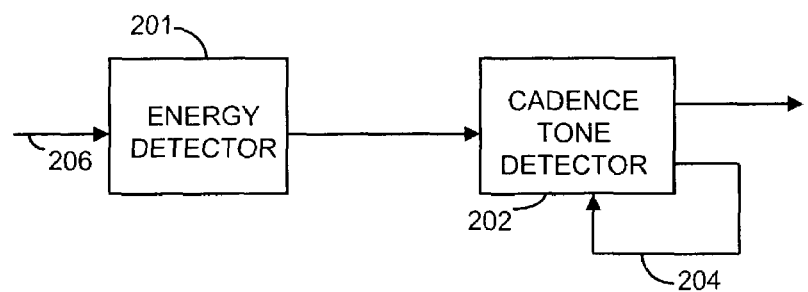
FIG. 2 illustrates, in block diagram form, an embodiment in accordance with the invention.

FIG. 2 illustrates, an embodiment of the invention. Energy detector 201 is responsive to the signal being received on input 206 to form this signal into energy and non-energy intervals as illustrated in FIG. 1. Cadence tone detector 202 is responsive to the energy and non-energy intervals received from energy detector 201 to identify the signal using cadence detection. If a interval terminates and a match is not found by cadence tone detector 202, detector 202 feeds the amount of time that had been determined plus the time interval of the noise back via feedback loop 204 and attempts to determine the signal based on the information that was fed back. This operation is shown in greater detail with respect to FIG. 3.

Figure 3:
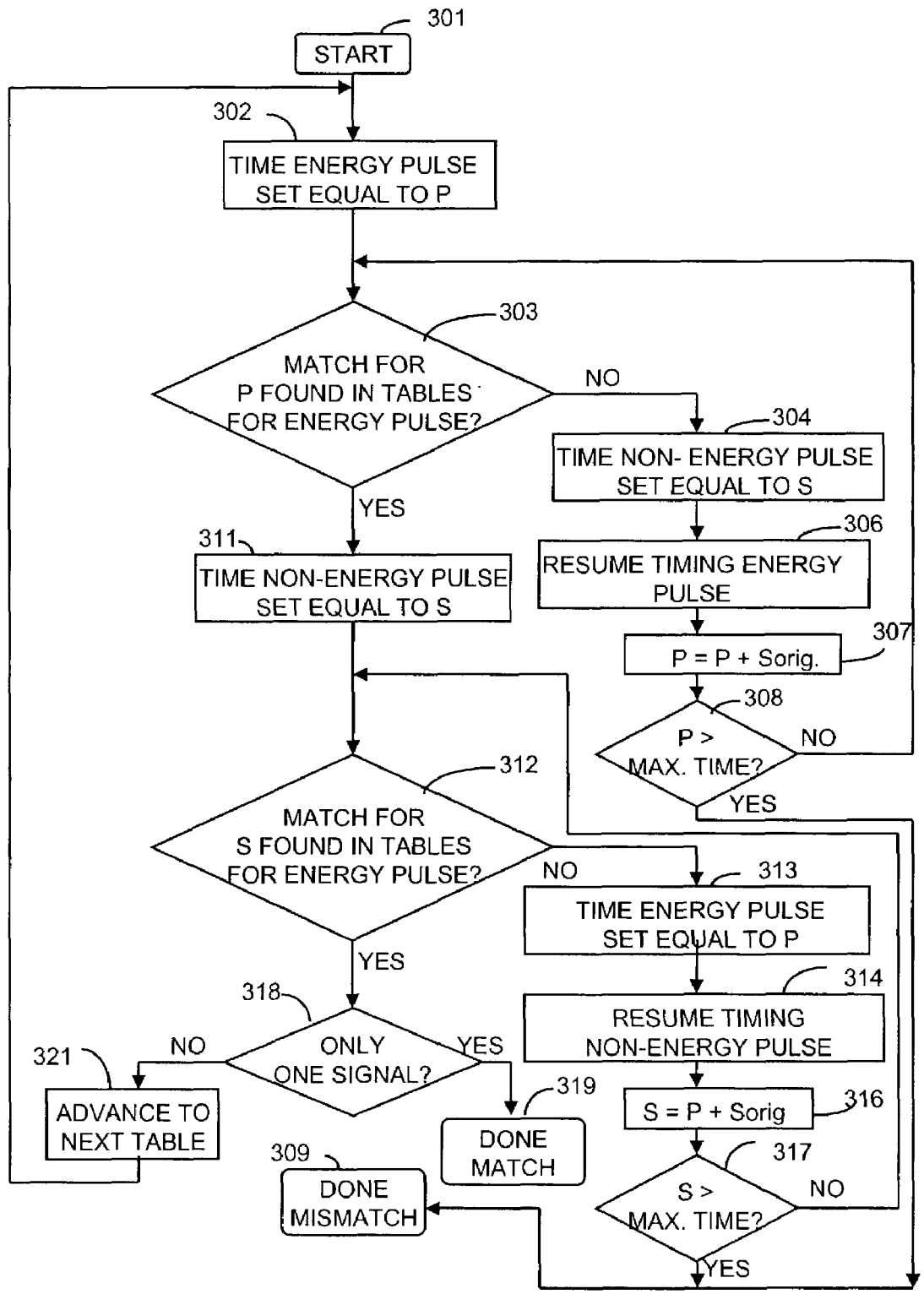
FIG. 3 illustrates, in flowchart form, operations performed by an embodiment of the invention.

FIG. 3 illustrates, in flowchart form, operations performed by an embodiment in accordance with the invention. The operations illustrated in FIG. 3 could be performed by the apparatus illustrated in FIG. 4. In addition, the operations of FIG. 3 utilize the tables illustrated in FIG. 5. For sake of example, consider that signal being detected is signal 101 and not signal 104 of FIG. 1. Once started in block 301, block 302 times an energy pulse and sets this time equal to P when the energy state changes to a non-energy state. For the first energy pulse, decision block 303 initially accesses cadence timing table pair 500. The cadence timing tables are arranged such that each table contains information on an energy interval and its associated non-energy level. The energy interval is referred to as P, and the non-energy interval is referred to as S. There is one cadence timing table for each associated pair of P/S intervals. Because of the variation that can occur in pulses such as those illustrated in FIG. 1, the timing tables allow for variances around the ideal pulse. This variance is accomplished by having multiple values (P=1 through P=y entries in timing column of table 510) for each possible signal of table 510. The time calculated in block 302 is utilized as an index into table 510 of cadence timing table pair 500. A valid energy interval will have a time duration that will correctly index into table 510 of cadence timing table pair 500. In other words, the time duration of the interval will equal one of the multiple values (P=1 through P=y entries in table 510). The corresponding value 522 is set equal to a "1" if a signal such as Signal 1 corresponds to the signal being detected. If a signal such as Signal 1 does not correspond to this particular amount of time, then the value 522 will be set equal to "0". The portion of the table 511 is configured in a similar way for the non-energy intervals. As can be seen from FIG. 1 absence noise, signals 102–104 will always have matches in the cadence timing table pair 500 since the initial energy pulse is of the same width for all of these signals.

Since a match is found in table 510 of cadence timing table pair 500, control will be transferred from decision block 303 to block 311. The latter block will then time the duration of the non-energy pulse and set this time equal to S. After the non-energy pulse/interval has been timed in block 311, control is transferred to decision block 312. Decision block 312 then accesses table 511 of cadence timing table pair 500. As can be seen from FIG. 1, signals 101–103 first non-energy interval is identical for all three signals. Since a match has been found in table 511 of cadence timing table pair 500, decision block 312 transfers control to decision block 318.

Decision block 318 determines if a match was found for only one signal in the cadence timing table pair 500. If the answer is yes, control is transferred to block 319 that signals a match and terminates the operation. If the answer in decision block 318 is no, control is transferred to block 321 which advances to the next cadence timing table pair. In the present example, this would be cadence timing table pair 501. Block 321 transfers control back to block 302. Since signal 101 is the signal being received, block 302 detects the energy pulse of the time duration indicated for pulse 108 and not the pulses 109 and 111 of signals 102 and 103, respectively. After the energy pulse is determined, decision block 303 accesses table 510 of cadence timing table pair 501 and achieves a match only for the signal represented by signal 101 of FIG. 1. Since a match was found in decision block 303, control is transferred to block 311 which times the non-energy pulse and sets this value equal to S before transferring control to decision block 312. Decision block 312 will find a match for only the signal represented by signal 101 of FIG. 1 in table 511 of cadence timing table pair 501. After execution of decision block 312, control is transferred to decision block 318. Since only one signal matched the contents of cadence timing table pair 501, control is transferred to block 319 that indicates the match and terminate the operation of the tone detector.

Consider now a second example. If the signal being detected is signal 104 of FIG. 1 (signal 101 with noise), it can be seen that when the energy goes to non-energy at point 106 of FIG. 1, that the resulting calculated time for the energy pulse will not find a match in table 510 of cadence timing table pair 500. If no match is found by decision block 303 in table 510, control is transferred to block 304. The latter block then times for the detected non-energy and sets this equal to S. Block 306 then times the energy interval. Once the non-energy occurs, control is transferred to block 316 which sets P equal to S plus the time that was originally determined for the energy period, $P_{org}$. Decision block 308 then determines if the resulting P is greater than the maximum amount of allowable time. The maximum amount of allowable time in cadence timing table pair 500 for the energy pulse is given by Y under the timing column for section 510. For the non-energy spike shown at point 106 in FIG. 1, the resulting P will not exceed Y, and control will be transferred by decision block 308 back to decision block 303.

Upon receiving control back for block 308, if the result in decision block 303 is yes, control is transferred to block 311 which times the non-energy interval and sets this time equal to S before transferring control to decision block 312. Decision block 312 utilizes the time calculated for the non-energy interval in block 311 and access cadence timing table pair 500 section 511 looking for a match. If a match is not found due to a noise spike as indicated by point 107 of FIG. 1, control is transferred to block 313. The latter block then times for the detected energy and sets this equal to P.

Block 314 then times the non-energy interval. Once the energy appears, control is transferred to block 316 which sets S equal to P plus the time that was originally determined for the non-energy period, $S_{org}$. Decision block 317 then determines if S is greater than the maximum allowable time which for the initial access of cadence timing table pair 500 will again be Y. If the answer is no in decision block 317, control is transferred back to decision block 312. If the answer in decision block 317 is yes, control is transferred to block 309 which will indicate that the detection operations are done but that no match was found.

Returning to decision block 312, if the answer is yes, control is transferred to decision block 318 which determines whether more than one signal was indicating a match when the indexing was performed into cadence timing table pair 500, section 511 utilizing the value S. If the answer is no, this indicates that more than one tone may be the correct tone. As can be seen from FIG. 1, this indeed would be the case for the accessing of cadence timing table pair 500 since the initial pair of signals 101–103 are the same with respect to energy intervals. If the answer is no in decision block 318, control is transferred to block 321 which advances to the next table illustrated in FIG. 5. After advancing to the next cadence timing table pair, control is transferred back to block 302. If the answer is yes in decision block 318, control is transferred to block 319. The latter block indicates that the operations are done and that a match was found and identifies the correct signal on the basis of the results of accessing the cadence timing table pair.

Figure 4:
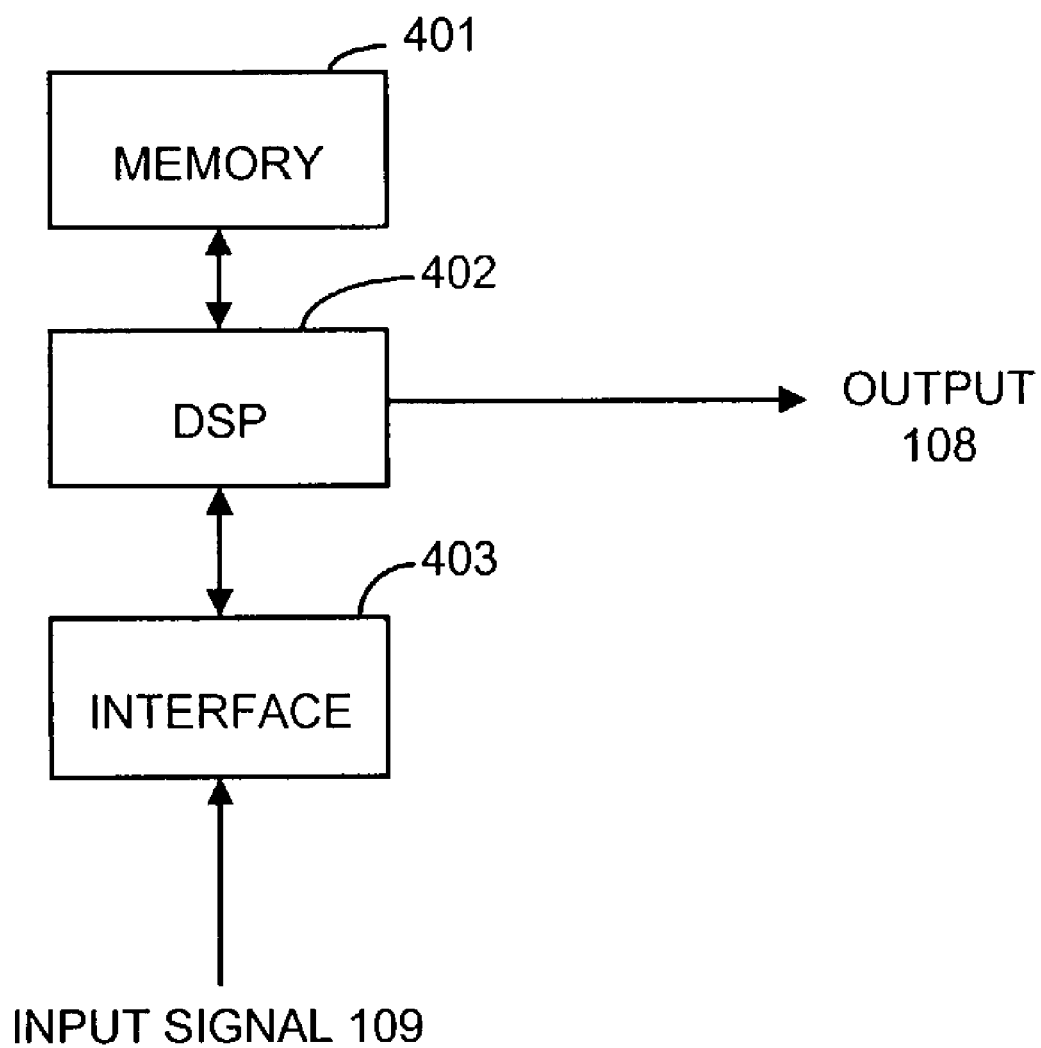
FIG. 4 illustrates, in block diagram form, an embodiment of the invention.

FIG. 4 illustrates in block diagram form, a processor for implementing the flowchart illustrated in FIG. 3. Although processor 402 is illustrated as being a digital signal processor (DSP), this processor could be a general purpose processor or could be implemented utilizing hardware logic. Memory 401 is utilized to store the program for the processor and to store intermediate data. The input signal is received via interface 403.

Of course, various changes and modifications to the illustrative embodiment described above will be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for detecting a signal corrupted by noise, comprising the steps of:
   converting the signal to a cadence signal having high energy intervals and low energy intervals;
   detecting for ones of a plurality of candidate signals that match the cadence signal in response to a one of energy intervals of the cadence signal;
   re-detecting for the ones of the plurality of candidate signals that match the cadence signal upon the step of detecting indicating a failure to determine a match with any of the plurality of candidate signals by converting a next one of energy intervals to be the same energy level as the interval, adding the interval and the converted interval together, and attempting to detect the one of the plurality of candidate signals.

2. The method of claim 1 wherein the step of re-detecting signaling a failure upon the detection failing to determine the match with any of the plurality of candidate signals.

3. The method of claim 1 further comprises the step of re-executing the step of detecting with the next sequential energy interval of the cadence signal upon the step of detecting determining a match.

4. The method of claim 1 further comprises the step of re-executing the step of detecting with the second next sequential energy interval of the cadence signal upon the step of re-detecting determining a match.

5. The method of claim 1 further signaling the signal as being a one of the plurality of candidate signals upon the step of detecting or re-detecting indicating only the one of the plurality of candidate signals matching.

6. A method for detecting a signal corrupted by noise, comprising the steps of:
   (a) converting the signal to a cadence signal having high energy intervals and low energy intervals;
   (b) timing a high energy interval;
   (c) accessing a table having a plurality of candidate signals with the time of the high energy interval for a match;
   (d) in response to a mismatch timing a low energy pulse, adding the time of low energy pulse to the high energy interval, resume timing the high energy interval, and repeating the step of (c) and in response to a match executing step (a);
   (e) timing a low energy interval;
   (g) accessing the table with the time of the low energy interval for a match;
   (h) in response to a mismatch timing a high energy pulse, adding the time of high energy interval to the low energy interval, resume timing the low energy interval, and repeating the step of (g) and in response to a match executing step (i); and
   (i) identifying the signal upon only one of the plurality of candidate signals indicating a match in the table and repeating the step of (b) if more than one of the plurality of candidate signals indicate a match in the table.

7. The method of claim 6 wherein the table comprises pairs of subtables in each of the pairs of subtable, one of the pair containing timing intervals for high energy intervals for the plurality of candidate signals and the other one of the pair containing timing intervals for low energy intervals for the plurality of candidate signals.

8. The method of claim 7 wherein the steps of accessing the table are done sequential through the pairs of subtables.

9. The method of claim 8 wherein the step of accessing the table with time of the high energy interval comprises the step of interrogating the one of the pairs of subtables.

10. The method of claim 8 wherein the step of accessing the table with time of the low energy interval comprises the step of interrogating the other one of the pairs of subtables.

11. The method of claim 6 wherein the step of (i) comprises signaling a failure if none of the candidate signal indicate a match.

12. The method of claim 6 wherein the step of (c) comprises signaling a failure if all of the pairs of subtables have been accessed.

13. The method of claim 6 wherein the step of (c) comprises signaling a failure if all of the pairs of subtables have been accessed.

14. An apparatus for detecting a signal corrupted by noise, comprising:
   a energy detector for converting the signal into a cadence signal having high energy intervals and low energy intervals;
   a cadence detector analyzing the cadence signal to determine the signal in response to a sequential one of the energy intervals;
   a path for feeding back the time of the sequential one of the energy intervals to the cadence detector upon the cadence detector failing to determine the signal;
   the cadence detector responsive to feed back time to convert the next sequential one of the energy intervals into the same type of energy interval as the sequential one of the energy interval, and add the feed back time, time of the converted energy interval, and time of the second next sequential energy interval to determine the signal.

* * * * *